United States Patent
Kang et al.

(10) Patent No.: US 11,383,581 B2
(45) Date of Patent: Jul. 12, 2022

(54) BLOWER UNIT OF AIR CONDITIONER FOR VEHICLE

(71) Applicant: Hanon Systems, Daejeon (KR)

(72) Inventors: In Keun Kang, Daejeon (KR); Jae Woo Ko, Daejeon (KR); Young Keun Kim, Daejeon (KR); Gyu Ik Han, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 181 days.

(21) Appl. No.: 16/605,541

(22) PCT Filed: May 18, 2018

(86) PCT No.: PCT/KR2018/005708
§ 371 (c)(1),
(2) Date: Oct. 16, 2019

(87) PCT Pub. No.: WO2018/216965
PCT Pub. Date: Nov. 29, 2018

(65) Prior Publication Data
US 2020/0122551 A1    Apr. 23, 2020

(30) Foreign Application Priority Data

May 22, 2017 (KR) .................. 10-2017-0062664
May 15, 2018 (KR) .................. 10-2018-0055323

(51) Int. Cl.
*B60H 1/00* (2006.01)
*F04D 29/42* (2006.01)
(Continued)

(52) U.S. Cl.
CPC ..... *B60H 1/00871* (2013.01); *B60H 1/00521* (2013.01); *B60H 1/26* (2013.01);
(Continued)

(58) Field of Classification Search
CPC .................. B60H 1/00871; B60H 1/26; B60H 1/00521; F04D 29/281; F04D 29/424
See application file for complete search history.

(56) References Cited

U.S. PATENT DOCUMENTS

| | | | |
|---|---|---|---|
| 6,110,035 A | 8/2000 | Uemura et al. | |
| 6,881,033 B2* | 4/2005 | Makinson | F04D 29/281 416/3 |
| 8,182,215 B2* | 5/2012 | Ito | F04D 25/166 415/206 |
| 8,235,649 B2* | 8/2012 | Kang | B60H 1/00514 415/102 |

(Continued)

FOREIGN PATENT DOCUMENTS

| | | |
|---|---|---|
| KR | 20010108769 A | 12/2001 |
| KR | 20020078058 A | 10/2002 |

(Continued)

OTHER PUBLICATIONS

Kamiya, WO 2017/208657 A1 English machine translation, Apr. 20, 2017 (Year: 2017).*

(Continued)

*Primary Examiner* — Steven S Anderson, II
*Assistant Examiner* — Phillip Decker
(74) *Attorney, Agent, or Firm* — Dickinson Wright PLLC

(57) ABSTRACT

The present invention relates to a two-layered blower unit of an air conditioner for a vehicle, which includes a means for smoothly guiding axially flowing air to flow in a radial direction and has optimized structure and arrangement for fixing the guide means.

15 Claims, 7 Drawing Sheets

(51) Int. Cl.
    *B60H 1/26* (2006.01)
    *F04D 29/28* (2006.01)
    *B60S 1/54* (2006.01)
(52) U.S. Cl.
    CPC ......... *F04D 29/281* (2013.01); *F04D 29/424* (2013.01); *B60S 1/54* (2013.01)

(56) References Cited

U.S. PATENT DOCUMENTS

| | | | | |
|---|---|---|---|---|
| 9,186,954 | B2* | 11/2015 | Ochiai | B60H 1/00471 |
| 9,568,020 | B2* | 2/2017 | Yasuda | F04D 17/162 |
| 10,792,973 | B2* | 10/2020 | Fujimoto | F04D 29/706 |
| 2006/0093472 | A1* | 5/2006 | Chen | F04D 29/283 |
| | | | | 415/129 |
| 2019/0092128 | A1* | 3/2019 | Kamiya | F04D 17/12 |

FOREIGN PATENT DOCUMENTS

| | | | |
|---|---|---|---|
| KR | 200436612 Y1 | 9/2007 | |
| KR | 101278629 B1 | 6/2013 | |
| WO | WO-2017163631 A1 * | 9/2017 | ......... B60H 1/00521 |
| WO | WO-2017208657 A1 * | 12/2017 | ............... B60H 1/32 |

OTHER PUBLICATIONS

International Search Report for related International Application No. PCT/KR2018/005708 dated Aug. 27, 2018, 5 pages, English Translation of the International Search Report Included.
Written Opinion of the International Searching Authority for related International Application No. PCT/KR2018/005708 dated Aug. 27, 2018, 11 pages.

* cited by examiner

PRIOR ART

Assembly direction

BLOWER UNIT OF AIR CONDITIONER FOR VEHICLE

CROSS-REFERENCE TO RELATED APPLICATIONS

This application is a U.S. National Stage of International Patent Application Serial No. PCT/KR2018/005708, filed May 18, 2018, and titled "Blower Unit of Heating, Ventilating and Air-Conditioning System for Vehicle", which claims the benefit of Korean Patent Application Serial No. 10-2017-0062664, filed May 22, 2017, and titled "Blower Unit of Two Layer Type Air Conditioner for Vehicle", and Korean Patent Application Serial No. 10-2018-0055323, filed May 15, 2018, and titled "Blower Unit of Two Layer Type Air Conditioner for Vehicle". The entire disclosures of each of the above applications are incorporated herein by reference.

TECHNICAL FIELD

The present invention relates to a blower unit of an air conditioner for a vehicle, and more particularly, to a blower unit of a two-layered air conditioner for a vehicle, which can selectively inhale indoor air or outdoor air into an air-conditioning case, thereby securing defogging performance and maintaining high heating performance during heating.

BACKGROUND ART

In general, an air conditioner for a vehicle is a device for heating or cooling the interior of the vehicle by introducing outdoor air to the interior of the vehicle or circulating indoor air to heat or cool. The air conditioner for a vehicle includes a blower unit for blowing indoor air or outdoor air into an air-conditioning case, an evaporator disposed inside the air-conditioning case for a cooling action, and a heater core for a heating action. Air cooled or heated by the evaporator or the heater core is selectively blown to each part of the interior of the vehicle.

Especially, a two-layered air conditioner has been developed in order to secure defogging performance and maintain high heating performance during heating. Cold outdoor air of low humidity is effective to defrost windows during traveling in a heating state, but it results in lowering indoor temperature.

The two-layered air conditioner realizes a two-layer air flow of indoor air and outdoor air to supply outdoor air to an upper part of a vehicle and circulate indoor air to a lower part of the vehicle in order to defog in the heating state, thereby effectively defrosting using fresh outdoor air of low humidity supplied to the upper part, offering fresh air to passengers, and maintaining high heating performance by supplying warm indoor air to the lower part.

Japanese Patent No. 3900965 (Jan. 12, 2007) discloses a blower unit of a two-layered air conditioner for a vehicle. FIG. 1 is a sectional view showing a blower unit of a conventional two-layered air conditioner for a vehicle.

As shown in FIG. 1, the blower unit of the two-layered air conditioner for a vehicle includes a case 1, and the case 1 has an indoor air inlet 11 for introducing indoor air and an outdoor air inlet 12 for introducing outdoor air. The case 1 further includes: an indoor air door 43 for adjusting the degree of opening of the indoor air inlet 11; an outdoor air door 44 for adjusting the degree of opening of the outdoor air inlet 12; and an air filter 5 disposed downstream of the indoor air door 43 and the outdoor air door 44 in an air flow direction.

Dual fans 2 and 3 rotating by a motor are disposed downstream of the air filter 5, and a first blowing passage 15 and a second blowing passage 16 are formed downstream of the dual fans 2 and 3 to be partitioned by a partition wall 14 of the case 1. The indoor air door 43 and the outdoor air door 44 rotate around a rotary shaft 41, and a partition plate 42 is formed integrally with the doors.

The partition plate 42 includes: a first plate part 42a extending from the rotary shaft 41 toward an arc-shaped surface of the case 1; and a second plate part 42b extending from the rotary shaft 41 toward the air filter 5. In a two-layer mode, a front end of the first plate part 42a is located between the indoor air inlet 11 and the outdoor air inlet 12, so that a channel for connecting the first blowing passage 15 from the indoor air inlet 11 and a channel for connecting the second blowing passage 16 from the outdoor air inlet 12 are divided from each other.

The conventional two-layered blower unit cannot smoothly move wind and is deteriorated in uniformity because of the structure that air flowing axially by rotation of the fan is blown in a radial direction.

DISCLOSURE

Technical Problem

Accordingly, the present invention has been made in view of the above-mentioned problems occurring in the prior art, and it is an object of the present invention to provide a two-layered blower unit of an air conditioner for a vehicle, which includes a means for smoothly guiding axially flowing air to flow in a radial direction and has optimized structure and arrangement for fixing the guide means.

Technical Solution

To accomplish the above object, according to the present invention, there is provided a blower unit of an air conditioner for a vehicle with a two-layered structure to divide and inhale indoor air and outdoor air, the blower unit including: a scroll case having a first inlet and a second inlet for inhaling at least one among indoor air and outdoor air, a first passageway which is an air passageway through the first inlet, and a second passageway which is an air passageway through the second inlet; a first fan disposed in the first passageway to inhale air from the first inlet; a second fan arranged in an axial direction with respect to the first fan and disposed in the second passageway to inhale air from the second inlet; a motor for rotating the first fan and the second fan; and a guide part disposed in the scroll case to guide the air inhaled axially through the inlet to flow in a radial direction, wherein the guide part has a first guide part disposed in the first passageway and a second guide part disposed in the second passageway.

Moreover, at least one of the plurality of guide parts is formed integrally with the fan.

Furthermore, the second guide part is formed integrally with the second fan.

Additionally, the first guide part is combined with an upper part of the second guide part.

In addition, the guide part is a cylindrical member.

Moreover, the guide part is tapered to form an inclined surface so that a cross-sectional diameter gets larger from the upstream side to the downstream side in an air flow direction.

Furthermore, the blower unit of the air conditioner for a vehicle further includes a main body having a boss for combining a rotary shaft of the motor, wherein the first fan is disposed above the main body and the second fan is disposed below the main body.

Additionally, the motor has an extension shaft extending axially from the rotary shaft, and the first guide part has a second boss for combining the extension shaft.

In addition, the guide part extends integrally in a downward direction from the main body.

Moreover, the second guide part is a cylindrical member having an upper portion which is opened, and the first guide part covers the opening portion of the second guide part.

Furthermore, a plurality of the fans have different diameters, and a plurality of the guide parts have different slopes depending on the diameters of the fans.

Additionally, a slope value of the guide part of the fan with a larger diameter is larger than a slope value of the guide part of the fan with a smaller diameter.

In addition, the slope value of the guide part of the fan arranged in the air passageway which is farther from the air inlet is larger than the slope value of the guide part of the fan arranged in the air passageway which is nearer to the air inlet.

Moreover, the rotary shaft of the motor penetrates through all of the plurality of guide parts to be assembled.

Furthermore, an end portion of the rotary shaft of the motor is fixed with a clip.

Additionally, the guide part has space portions formed therein.

In addition, the guide part has one or more ribs therein in order to reinforce rigidity.

Moreover, the lower guide part has a stepped portion corresponding to a motor housing.

Furthermore, one among the main body and the guide part has a groove formed inwardly, and the other one has a protrusion combined with the groove.

In another aspect of the present invention, there is provided a blower unit of an air conditioner for a vehicle with a two-layered structure to divide and inhale indoor air and outdoor air, the blower unit including: a scroll case having a first inlet and a second inlet for inhaling at least one among indoor air and outdoor air, a first passageway which is an air passageway through the first inlet, and a second passageway which is an air passageway through the second inlet; a first fan disposed in the first passageway to inhale air from the first inlet; a second fan arranged in an axial direction with respect to the first fan and disposed in the second passageway to inhale air from the second inlet; a motor for rotating the first fan and the second fan; and a guide part disposed in the scroll case to guide the air inhaled axially through the inlet to flow in a radial direction, wherein the guide part is formed integrally with the second fan.

Additionally, the blower unit of the air conditioner for a vehicle further includes a main body above which the first fan is disposed and below which the second fan is disposed, wherein the guide part extends integrally with the main body to be inclined downwardly from the main body and is a cylindrical member having an upper portion opened, and wherein a cover member of a flat plate shape covers the upper opening portion of the cylindrical member.

Advantageous Effects

As described above, the blower unit of an air conditioner for a vehicle can uniformly discharge air without one-sidedness since the guide means are disposed in the two passageways, and is easy to manufacture by providing the optimized arrangement and structure in consideration of formability.

MODE FOR INVENTION

Hereinafter, with reference to the attached drawings, technical structure and configuration of a blower unit of an air conditioner for a vehicle according to a preferred embodiment of the present invention will be described in detail.

Figure 1:
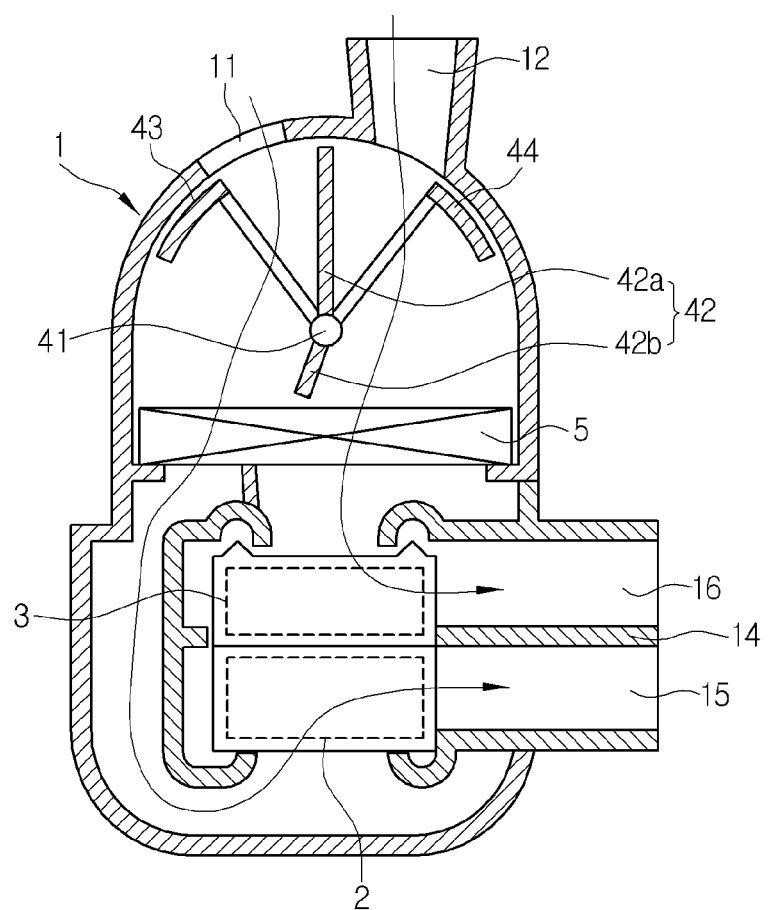
FIG. 1 is a sectional view showing a blower unit of a conventional two-layered air conditioner for a vehicle.
Figure 2:
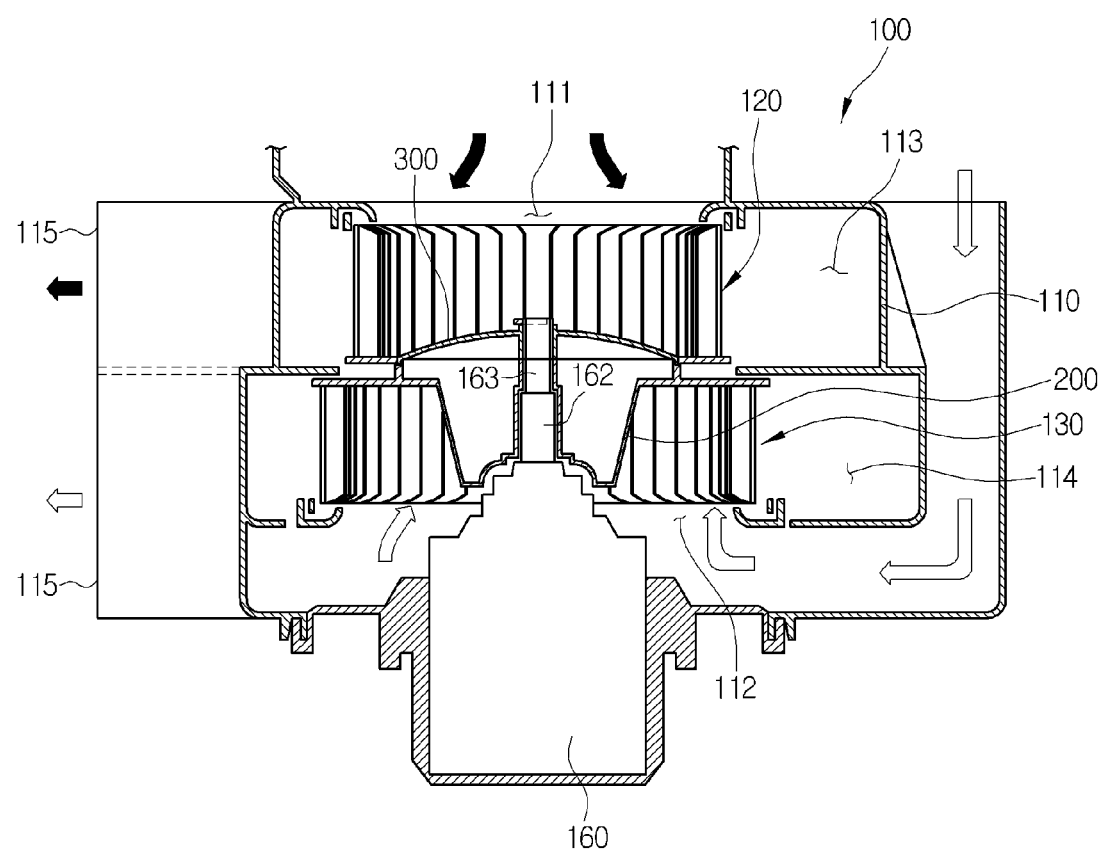
FIG. 2 is a sectional view showing a blower unit of an air conditioner for a vehicle according to a first preferred embodiment of the present invention.
Figure 3:
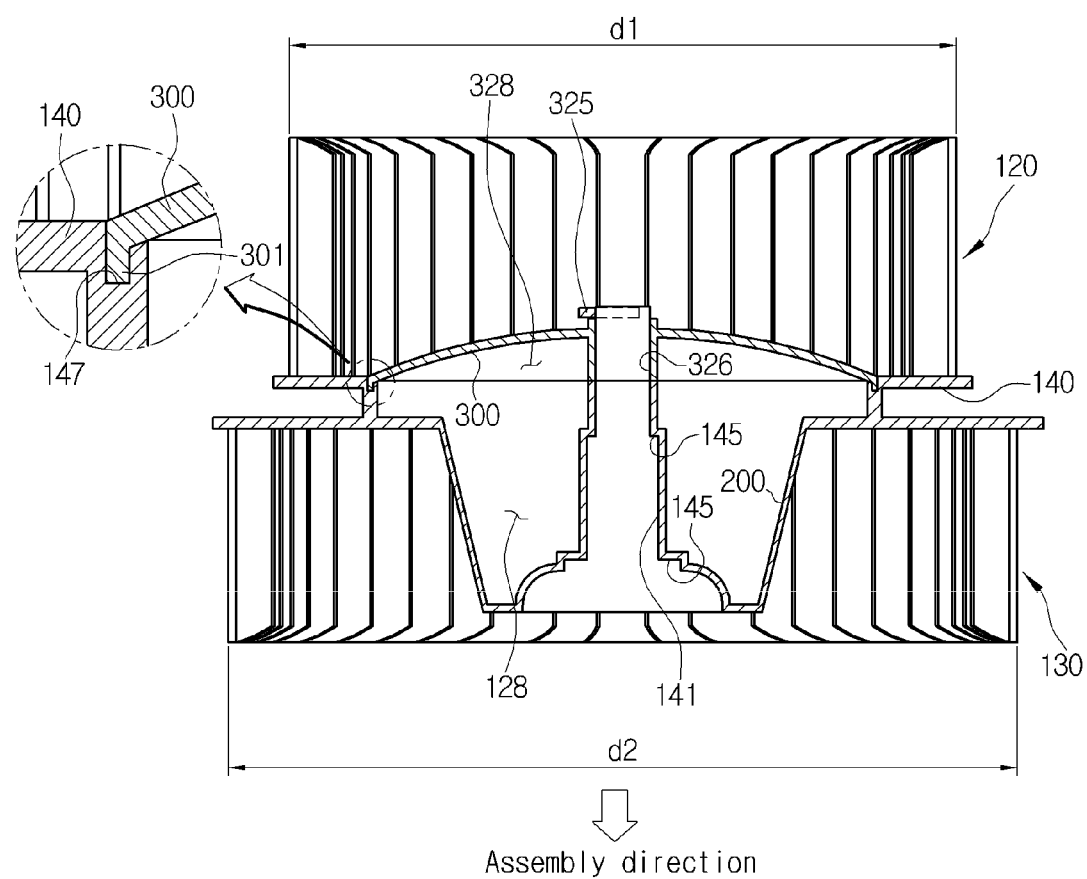
FIG. 3 is an enlarged sectional view of a guide part of FIG. 2.
Figure 4:
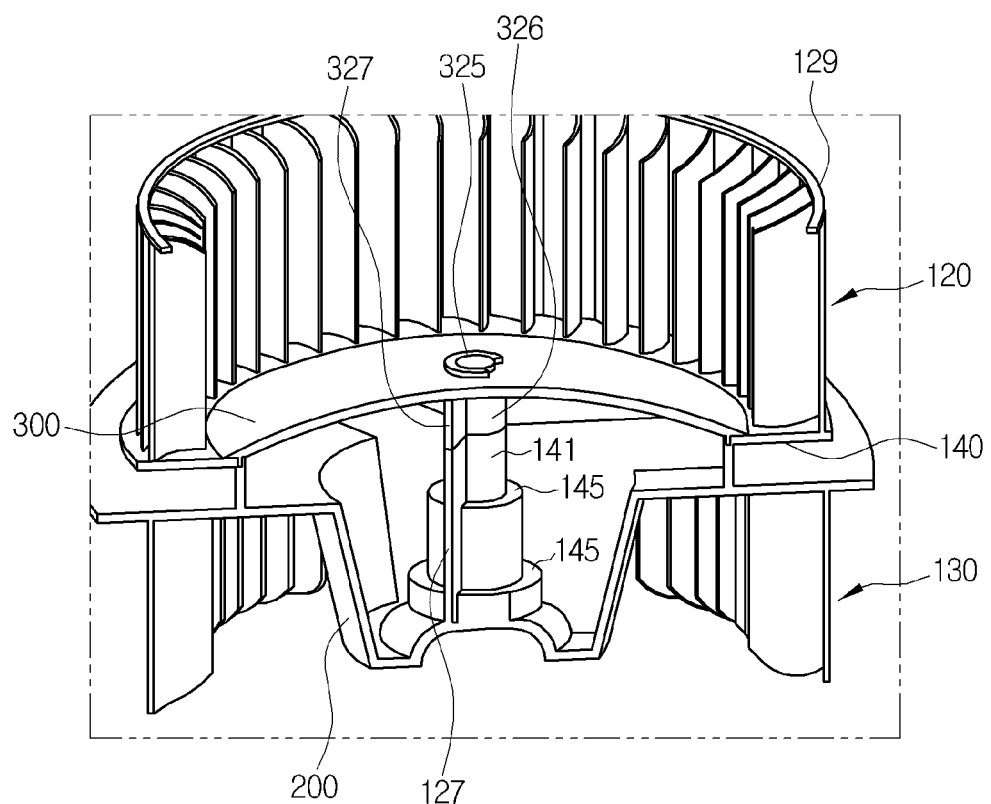
FIG. 4 is an enlarged perspective view of the guide part of FIG. 2.
Figure 5:
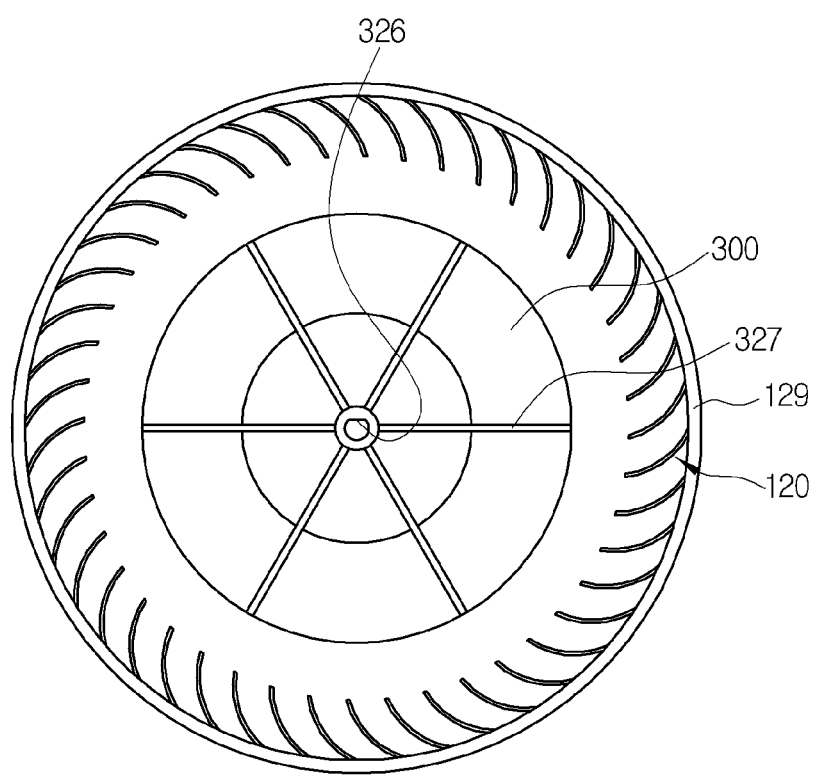
FIG. 5 is a view showing a first fan according to the first preferred embodiment of the present invention.

FIG. 2 is a sectional view showing a blower unit of an air conditioner for a vehicle according to a first preferred embodiment of the present invention, FIG. 3 is an enlarged sectional view of a guide part of FIG. 2, FIG. 4 is an enlarged perspective view of the guide part of FIG. 2, and FIG. 5 is a view showing a first fan according to the first preferred embodiment of the present invention. Hereinafter, the vertical direction in FIG. 2 is an "axial direction", and the horizontal direction is a "radial direction".

As shown in FIGS. 2 to 5, the blower unit 100 of the air conditioner for a vehicle according to the first preferred embodiment of the present invention has a two-layered structure which can separately inhale indoor air and outdoor air, and includes a scroll case 110, a first fan 120, a second fan 130, a motor 160, and a guide part.

The scroll case 110 has a first inlet 111 and a second inlet 112 for inhaling at least one among indoor air and outdoor air. The scroll case 110 includes: a first passageway 113 which is an air passageway through the first inlet 111, and a second passageway 114 which is an air passageway through the second inlet 112. An indoor air inlet and an outdoor air inlet, and an intake unit (not shown) having an indoor and outdoor air converting door for selectively introducing indoor air and outdoor air are combined with an upper part of the scroll case 110.

The first inlet 111 is opened toward the upper part, and the second inlet 112 is opened toward a lower part. The first passageway 113 has a scroll shape, and air is inhaled from the first inlet 111 through the first passageway 113. The second passageway 114 has a scroll shape, and air is inhaled from the second inlet 112 through the second passageway 114. An end portion 115 of the scroll case 110 is opened and is connected with an air-conditioning unit.

A first fan 120 is disposed in the first passageway 113 to inhale air from the first inlet 111. A second fan 130 is disposed in the second passageway 114 to inhale air from the second inlet 112. The first fan 120 and the second fan 130 are centrifugal fans. Rim parts 129 are disposed at wheel end portions of the first fan 120 and the second fan 130 to connect a plurality of wheels. Air is inhaled in an axial direction by rotation of the first fan 120 and the second fan 130, and is sent to the outside of the scroll case 110 in the radial direction.

The first fan 120 and the second fan 130 are arranged in the axial direction, and are connected with each other by a main body 140 of a disc shape or a board shape. An axial inner end portion of the first fan 120, namely, a lower end portion, is connected with an axial inner end portion, namely, an upper end portion of the second fan 130 by the main body 140.

The main body 140 has a boss 141 at a middle portion. The boss 141 protrudes and extends from the second fan 130 toward the first fan 120. A rotary shaft 162 of the motor 160 is inserted and connected into the boss 141. The first fan 120 is disposed above the main body 140, and the second fan 130 is disposed lower the main body 140. The second inlet 112 is covered by a cover under the scroll case 110. The motor 160 rotates the first fan 120 and the second fan 130.

A guide part is a cylindrical member and is disposed inside the scroll case 110 in order to guide the air inhaled axially through the inlet to move in the radial direction. The guide part includes a first guide part 300 disposed in the first passageway 113 and a second guide part 200 disposed in the second passageway 114.

The first guide part 300 is an upper guide part, and the second guide part 200 is a lower guide part. The first guide part 300 guide the air inhaled through the first inlet 111 to be discharged through the first passageway 113. The second guide part 200 guides the air inhaled through the second inlet 112 to be discharged through the second passageway 114.

The second guide part 200 is disposed in the motor 160, and is arranged inside the second inlet 112, in more detail, inside a wing part of the second fan 130 in the radial direction. Preferably, the second guide part 200 is arranged inside the wing part of the second fan 130 also in the axial direction. The second guide part 200 extends from the motor 160 toward the main body 140 in the axial direction to cover the rotary shaft 162 of the motor 160.

The second guide part 200 guides wind inhaled to the second inlet 112 so that the wind is uniformly discharged to the wing part of the second fan 130, and acts as a flow control element to rapidly inhale air by the second fan 130. Moreover, the second guide part 200 acts as a waterproof element for preventing water from entering the motor 160. A radial outer portion of the second guide part 200 is tapered and inclined.

The first guide part 300 is arranged inside a wing part of the first fan 120 in the radial direction. Preferably, the first guide part 300 is arranged inside the wing part of the first fan 120 even in the axial direction. The first guide part 300 guides wind inhaled to the first inlet 111 so that the wind is uniformly discharged to the wing part of the first fan 120, and acts as a flow control element to rapidly inhale air by the first fan 120.

The second guide part 200 is formed integrally with the second fan 130. The second guide part 200 extends integrally with the main body 140 to be inclined downwardly from the main body 140. That is, the guide part 200 is tapered to form an inclined surface so that a cross-sectional diameter gets larger from the upstream side to the downstream side in the air flow direction.

The second guide part 200 is formed integrally with the main body 140 to be formed easily. The structure that the guide part 200 is formed integrally with the second fan 130 is better in formability in consideration of a mold design than the structure that the guide part is fixed to the scroll case. The second guide part 200 has nothing to have an opening part in consideration of a removal structure for injection-molding. Therefore, an upper part of the second guide part 200 is opened, and the upper opening part of a cylinder type member is covered by the first guide part 300.

The first guide part 300 is combined with an upper part of the second guide part 200. The first guide part 300 covers the opening part of the second guide part 200 to partition the second passageway 114 from the first passageway 113. Furthermore, the first guide part 300 guides wind inhaled to the first inlet 111 like the second guide part 200 so that the wind is uniformly discharged to the wing part of the first fan 120, and acts as a flow control element to rapidly inhale the air by the first fan 120.

The second guide part 200 can enhance assemblability through the structure that the second guide part 200 is formed integrally with the second fan 130. That is, in case of a structure that the guide parts are formed at the upper part and the lower part, just one guide part can be injection-molded integrally in consideration of the mold removal structure. If just one guide part is injection-molded integrally, it is advantageous to assemble the upper guide part separately.

In the meantime, the plurality of fans have different diameters, and the plurality of guide parts are formed with different slopes depending on diameters of the fans. A slope value of the guide part of the fan with a larger diameter is larger than a slope value of the guide part of the fan with a smaller diameter. That is, a diameter d2 of the second fan 130 is larger than a diameter d1 of the first fan 120, and the slope value of the second guide part 200 is larger than the slope value of the first guide part 300. Because the air passageway is wider if the diameter of the fan is larger, pneumatic pressure becomes lower. Therefore, if the slope of the guide part of the air passageway having relatively lower pneumatic pressure gets larger, the guide part can guide more air.

Additionally, the slope value of the guide part of the fan arranged in the air passageway which is farther from the air inlet is larger than the slope value of the guide part of the fan arranged in the air passageway which is nearer to the air inlet. That is, the slope value of the second guide part 200 arranged farther from the air inlet is larger than the slope value of the first guide part 300 of the opposite side. Because the air flowing toward the second passageway 114 with higher air resistance due to a change of direction while passing through the air passageway needs the air flow guide more than the air directly flowing toward the first passageway 113, the slope of the second guide part 200 is larger than that of the first guide part 300.

Moreover, the rotary shaft of the motor 160 penetrates through the plurality of guide parts to be assembled. That is, the rotary shaft 162 of the motor 160 penetrates through the second guide part 200 and the first guide part 300 in sequence to be assembled. An end portion of the rotary shaft of the motor 160 is fixed with a clip 325. Through the above structure, the present invention can prevent misassembly since a worker can check whether or not the fan is well-assembled to the rotary shaft of the motor with naked eyes.

The guide part has space portions 128 and 328 formed therein. The first guide part 300 and the second guide part 200 are formed in a hollow shape. Therefore, the present invention can reduce weight and improve structural intensity. In this instance, it is preferable to have one or more ribs 127 and 327 inside the guide part in order to reinforce rigidity. The rib 327 is injection-molded integrally with the first guide part 300, and the other rib 127 is injection-molded integrally with the second guide part 200.

Furthermore, the lower guide part has a stepped portion 145 corresponding to a motor housing. A plurality of stepped portions 145 which get narrower toward the upper part are formed on boss 141 of the second guide part 200. The stepped portions 145 enhances assemblability when being assembled with the motor 160, and strengthens axial binding power between the motor and the fan. The motor 160 has an extension shaft 163 extending from the rotary shaft 162 in the axial direction. The first guide part 300 has a second boss 326 to combine the extension shaft 163.

Additionally, the main body 140 has a groove 147 formed inwardly, and the first guide part 300 has a protrusion 301 combined with the groove 147.

Figure 6:
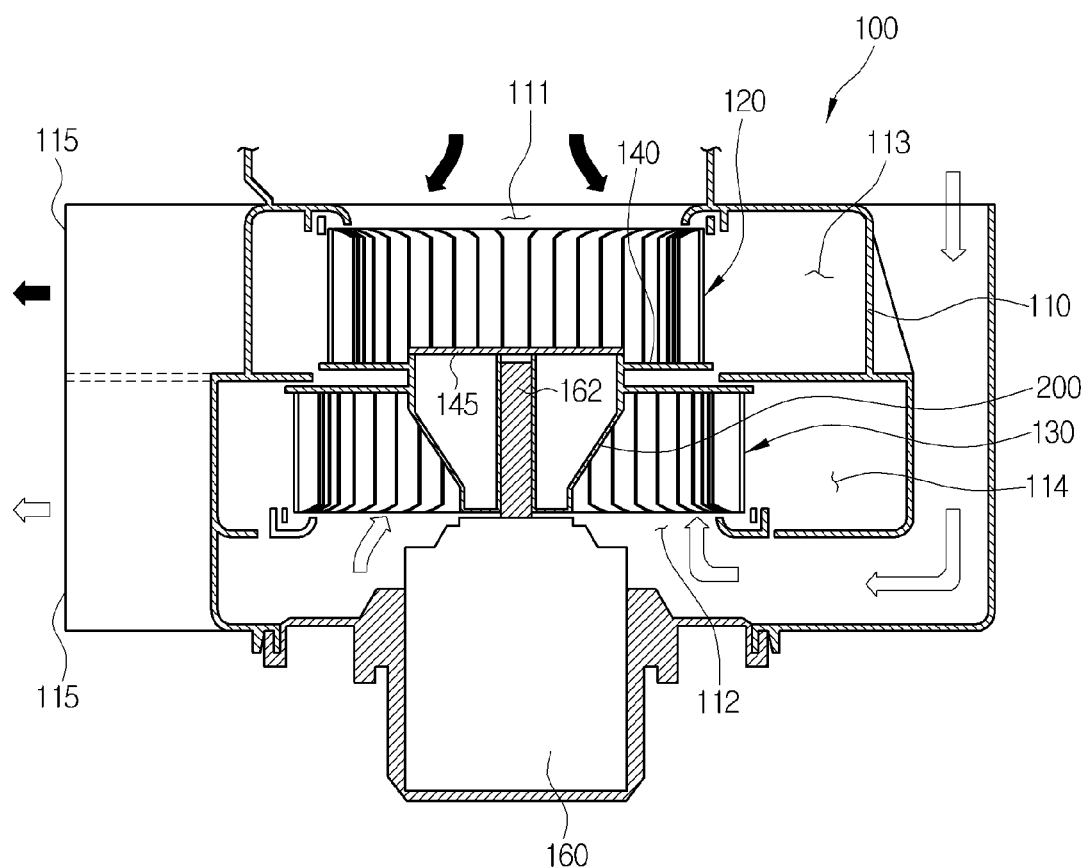
FIG. 6 is a sectional view showing a blower unit of an air conditioner for a vehicle according to a second preferred embodiment of the present invention.
Figure 7:
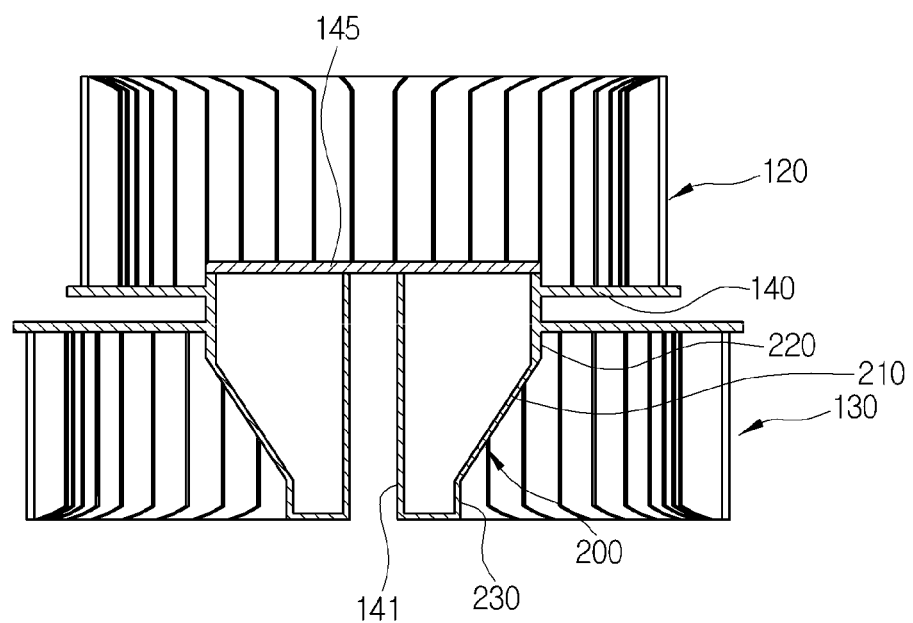
FIG. 7 is an enlarged sectional view of a guide part of FIG. 5.

FIG. 6 is a sectional view showing a blower unit of an air conditioner for a vehicle according to a second preferred embodiment of the present invention, and FIG. 7 is an enlarged sectional view of a guide part of FIG. 5.

Referring to FIGS. 6 and 7, the blower unit of the air conditioner for a vehicle according to the second preferred embodiment of the present invention includes a scroll case 110, a first fan 120, a second fan 130, a motor 160, and a guide part 200. Because the scroll case 110, the first fan 120, the second fan 130 and the motor 160 are the same as the first embodiment, their descriptions will be omitted. The guide part 200 has the same reference numeral as the second guide part 200 of the first preferred embodiment since the guide part 200 of the second preferred embodiment is similar with the second guide part 200 of the first preferred embodiment.

The guide part 200 is a cylindrical member and is disposed inside the scroll case 110 to guide the air axially inhaled through the inlet to flow in the radial direction. The guide part 200 is formed integrally with the second fan 130. The guide part 200 guides the air inhaled through the second inlet 112 to be discharged through the second passageway 114.

The first fan 120 and the second fan 130 are arranged in the axial direction, and are connected with each other by a main body 140. The main body 140 has a boss 141 formed at a middle portion. The boss 141 protrudes toward the second fan 130. A rotary shaft 162 of the motor 160 is inserted and connected into the boss 141. The first fan 120 is disposed above the main body 140 and the second fan 130 is disposed below the main body 140.

The guide part 200 is inclined downwardly from the main body 140 and extends integrally. That is, the guide part 200 is tapered to form an inclined surface so that a cross-sectional diameter gets larger from the upstream side to the downstream side in the air flow direction.

The guide part 200 includes: an axial inner portion 220 extending outwardly in the axial direction from the main body 140, namely, extending downwardly; an inclined surface 210 formed downwardly from the axial inner portion 220 to get smaller in diameter; and an axial outer portion 230 extending downwardly from the inclined surface 210. The axial inner portion 220 and the axial outer portion 230 have uniform diameter. The guide part 200 is formed integrally with the main body 140 to be formed easily.

While the present invention has been particularly shown and described with reference to exemplary embodiments thereof, it will be understood by those of ordinary skill in the art that various modifications and equivalents may be made without deviating from the spirit or scope of the invention. Therefore, it would be understood that the technical and protective scope of the present invention shall be defined by the technical idea as defined by the following claims and the equivalences.

The invention claimed is:

1. A blower unit of an air conditioner for a vehicle with a two-layered structure to divide and inhale indoor air and outdoor air, the blower unit comprising:
    a scroll case having a first inlet and a second inlet for inhaling at least one among indoor air and outdoor air, a first passageway which is an air passageway through the first inlet, and a second passageway which is an air passageway through the second inlet;
    a first fan disposed in the first passageway to inhale air from the first inlet;
    a second fan arranged in an axial direction with respect to the first fan and disposed in the second passageway to inhale air from the second inlet;
    a motor for rotating the first fan and the second fan; and
    a guide part disposed in the scroll case to guide the air inhaled axially through the inlets to flow in a radial direction,
    wherein the guide part has a first guide part disposed in the first passageway and a second guide part disposed in the second passageway;
    wherein the second guide part is formed integrally with the second fan and has at least a portion that is substantially frustoconical shaped, and
    wherein the motor rotates the second fan and the second guide part to guide the air inhaled from the second inlet to be discharged through the second passageway;
    wherein the second guide part has an upper portion which is opened, and
    wherein the first guide part covers the opening portion of the second guide part.

2. The blower unit according to claim 1, wherein the first guide part is combined with an upper part of the second guide part.

3. The blower unit according to claim 1, further comprising:
    a main body having a boss for receiving a rotary shaft of the motor,
    wherein the first fan is disposed above the main body and the second fan is disposed below the main body.

4. The blower unit according to claim 3, wherein the motor has an extension shaft extending axially from the rotary shaft, and the first guide part has a second boss for receiving the extension shaft.

5. The blower unit according to claim 3, wherein the guide part extends integrally in a downward direction from the main body.

6. The blower unit according to claim 3, wherein one of the main body and the guide part has a groove formed inwardly, and the other of the main body and the guide part has a protrusion combined with the groove.

7. The blower unit according to claim 1, wherein the first fan and the second fan have different diameters, and wherein the first and second guide parts have different slopes depending on the diameters of the first and second fans.

8. The blower unit according to claim 7, wherein a slope value of one of the first and second guide part of one of the first and second fans with a larger diameter is larger than a slope value of the one of the first and second guide parts of the one of the first and second fans with a smaller diameter.

9. The blower unit according to claim 8, wherein the slope value of the guide part of the one of the first and second fans arranged in the air passageway which is further from the air inlet is larger than the slope value of the one of the first and second guide parts of the one of the first and second fans arranged in the air passageway which is nearer to the air inlet.

10. The blower unit according to claim 1, wherein a rotary shaft of the motor penetrates through the first and second guide parts to be assembled.

11. The blower unit according to claim 10, wherein an end portion of the rotary shaft of the motor is fixed with a clip.

12. The blower unit according to claim 1, wherein the guide part has space portions formed therein.

13. The blower unit according to claim 12, wherein the guide part has one or more ribs formed thereon in order to reinforce rigidity.

14. The blower unit according to claim 1, wherein the second guide part has a stepped portion corresponding to a motor housing.

15. A blower unit of an air conditioner for a vehicle with a two-layered structure to divide and inhale indoor air and outdoor air, the blower unit comprising:
- a scroll case having a first inlet and a second inlet for inhaling at least one among indoor air and outdoor air, a first passageway which is an air passageway through the first inlet, and a second passageway which is an air passageway through the second inlet;
- a first fan disposed in the first passageway to inhale air from the first inlet;
- a second fan arranged in an axial direction with respect to the first fan and disposed in the second passageway to inhale air from the second inlet;
- a motor for rotating the first fan and the second fan; and
- a guide part disposed in the scroll case to guide the air inhaled axially through the inlets to flow in a radial direction,
wherein the guide part has at least a portion that is substantially frustoconical shaped and is formed integrally with the second fan,
wherein the motor rotates the second fan and the guide part to guide the air inhaled from the second inlet to be discharged through the second passageway;
a main body disposed below the first fan and above the second fan,
wherein the guide part extends integrally with the main body to be inclined downwardly from the main body and has an upper portion being opened, and
wherein a cover member of a flat plate shape covers the upper portion of the guide part.

* * * * *